(12) United States Patent
Koden et al.

(10) Patent No.: US 7,006,171 B1
(45) Date of Patent: Feb. 28, 2006

(54) LIGHT-CONTROL DEVICE AND METHOD OF DRIVING

(75) Inventors: Mitsuhiro Koden, Nara (JP); Masaaki Kabe, Atsugi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/937,796

(22) PCT Filed: Mar. 17, 2000

(86) PCT No.: PCT/JP00/01687

§ 371 (c)(1),
(2), (4) Date: Jan. 28, 2002

(87) PCT Pub. No.: WO00/60408

PCT Pub. Date: Oct. 12, 2000

(30) Foreign Application Priority Data

Mar. 31, 1999 (JP) ................................. 11-090522
Feb. 1, 2000 (JP) ............................... 2000-024406

(51) Int. Cl.
*G02F 1/1335* (2006.01)
(52) U.S. Cl. ........................................ 349/61; 349/139
(58) Field of Classification Search .................. 349/61, 349/56, 69, 139, 147
See application file for complete search history.

(56) References Cited

U.S. PATENT DOCUMENTS

| | | | | |
|---|---|---|---|---|
| 4,772,885 A | * | 9/1988 | Uehara et al. ................. 349/71 |
| 5,402,143 A | * | 3/1995 | Ge et al. ..................... 345/102 |
| 5,535,027 A | * | 7/1996 | Kimura et al. ................ 349/41 |
| 5,572,341 A | * | 11/1996 | Fergason ..................... 349/200 |
| 5,760,858 A | * | 6/1998 | Hodson et al. ............... 349/61 |
| 5,912,651 A | * | 6/1999 | Bitzakidis et al. ............ 345/58 |
| 6,025,894 A | * | 2/2000 | Shirasaki et al. ............. 349/69 |
| 6,222,512 B1 | * | 4/2001 | Tajima et al. ................. 345/63 |

FOREIGN PATENT DOCUMENTS

| JP | 62035325 A | 2/1987 |
|---|---|---|
| JP | 02111922 A | 4/1990 |

(Continued)

OTHER PUBLICATIONS

D. Bonnet, D. Fischer, "Method and device for enhancing the visual contrast in matrix liquid crystal displays", WO 87/07395, Published Dec. 3, 1987.*

(Continued)

*Primary Examiner*—Thong Nguyen
*Assistant Examiner*—Arnel C. Lavarias
(74) *Attorney, Agent, or Firm*—Edwards Angell Palmer & Dodge LLP; David G. Conlin; George W. Hartnell, III

(57) ABSTRACT

An optical control device in accordance with the present invention includes a substrate (1) with light output layers (4); a substrate (2) with a light transmitting function, positioned opposite to the substrate (1); and a liquid crystal (3) sandwiched between the substrates (1) and (2), one of the substrates (1) and (2) having gate electrodes (9) for applying multiple scan signals, one of the substrates (1) and (2) having source electrodes for applying multiple signal electrodes, wherein the light output layers (4) are arranged in stripes and extend in the same direction as the gate electrodes (9).

40 Claims, 14 Drawing Sheets

FOREIGN PATENT DOCUMENTS

| | | |
|---|---|---|
| JP | 5-307175/1993 | 11/1993 |
| JP | 06186561 | 7/1994 |
| JP | 06222360 | 8/1994 |
| JP | 7-301799/1995 | 11/1995 |
| JP | 8-211832/1996 | 8/1996 |
| JP | 10186310 | 7/1998 |
| JP | 11064820 | 3/1999 |

OTHER PUBLICATIONS

*Invited Paper: Photoluminescent LCDs (PL-LCDs)Using Phosphors,* W.A. Crossland, et al., SID 97 Digest (1997) pp. 837-840.

*Field Sequential Full Color LCD Without Color Filter for AM-LCD,* Tatsuo Uchida, et al., Proc. IDRC (1997) pp. 37-40.

* cited by examiner

F I G. 6
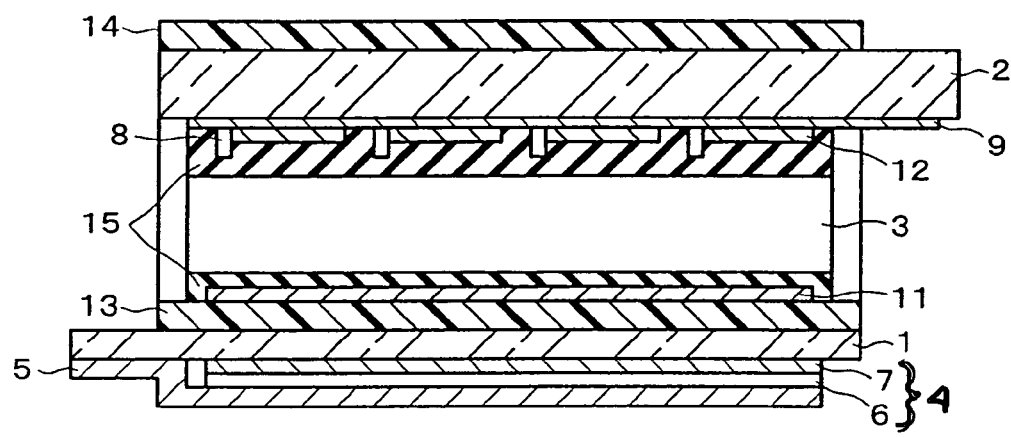

LIGHT-CONTROL DEVICE AND METHOD OF DRIVING

TECHNICAL FIELD

The present invention relates to a novel optical control device for use with display elements, etc., and especially, relates to an optical control device for combination with liquid crystal elements and a method of driving the same.

BACKGROUND ART

Nowadays, the liquid crystal display is used in a wide range of applications from television sets to video players, personal computers, word processing machines, projectors, to name a few, to exploit its high energy efficiency and low weight. The technology is however far from being mature, leaving even liquid crystal displays developed for practical use with problems that should be addressed.

The first problem is a low efficiency in the use of light. In a typical color liquid crystal display, a polarizer has a transmittance of ½ or lower, and a color filter has a transmittance of ⅓ or lower. Considering the aperture ratio and other factors, only 10% or less of the light emitted by the backlight is actually used; the ratio drops to 5% or even further under normal conditions. The low efficiency in light use leads directly to increases in power consumption. This is a problem that calls for serious attention, especially, if we consider the fact that we live in the 21 st century when environment- and energy-friendly technologies are increasingly essential.

To address this problem, several approaches have been made. One of them is to eliminate the backlight; these types of liquid crystal displays are termed reflective and includes no backlight power supply, effectively having cut down on power consumption. Nevertheless, the current reflective liquid crystal display can offer a contrast no higher than 20:1, which is hardly adequate to produce a really beautiful image.

Another approach is to eliminate the color filters which are a cause to reduce light transmission efficiency; although retaining the backlight, these types of liquid crystal displays boast improved light transmission efficiency, thanks to the elimination of the color filters. W. A. Crossland et al. suggest in SID 97 Digest, 837(1997), a way to implement the idea by replacing the color filters with a luminescent substance called photoluminescent. According to the method, however, the contrast is insufficiently low, and the use of ultraviolet light as the light source will likely damage the liquid crystal material and alignment film, which are issues that must be further addressed.

A field sequential color scheme is also publicly known which makes use of a backlight that switches colors between red, green, and blue in a time sequence (T. Uchida et al., Proc. IDRC, 37(1997)). This scheme again has problems, such as the requirement that liquid crystal with very high response be used.

Another problem with the liquid crystal display is that its image quality is inferior to that of the CRT. The liquid crystal display is a hold-type display and suffers persistent images and blurred edges when producing animation, whereas the CRT is an impulse-type display and is free from those shortcomings. The International Business Machines Corp.(IBM) has recently made a suggestion to solve these problems by the use of a liquid crystal display of an impulse type. The impulse-type liquid crystal display again has problems including those related with the response speed of the liquid crystal and the emission/extinguishment speed of light by the backlight.

To address the low efficiency in the use of light, the poor image quality, and other conventional problems, organic EL (Electro Luminescence) elements have been developed which shine in accordance with the pattern of liquid crystal display elements. A technology of this kind is disclosed in Japanese laid-open patent application 8-211832 (Tokukaihei 8-211832/1996, published on Aug. 20, 1996), for example.

The technology disclosed the laid-open patent application involves a liquid crystal display element section and an organic EL display element section. The liquid crystal display element section is chiefly made of liquid crystal and two sets of transparent electrodes positioned opposite each other to sandwich the liquid crystal. The organic EL display element section is chiefly made of an organic EL light emitting layer and two sets of transparent electrodes positioned opposite each other to sandwich the organic EL light emitting layer. The organic EL display element section is stacked on the liquid crystal display element section, and both display element sections are addressed by a single drive section to drive associated pixels of the liquid crystal display element section and the organic EL display element section. The liquid crystal display element section and the organic EL display element section thus display an identical image.

However, the technology requires both a matrix-type liquid crystal display element and a matrix-type organic EL display element stacked thereon, adding to the panel fabrication cost. An inevitably increased number of driver ICs adds further cost to the total production cost of the display apparatus.

Moreover, since a transparent substrate is positioned between the two display elements, the display apparatus provides poor visibility when viewed from an oblique angle. Attempts to improve the visibility will present other challenges: The aperture ratio must be reduced; and an ultra-thin, but expensive transparent substrate must be used.

The present invention, to solve these problems, has an objective to offer a novel optical control device capable of producing a visibility-improved impulse display without using a color filter and to offer a method of driving the device.

DISCLOSURE OF THE INVENTION

To achieve the objective, an optical control device in accordance with the present invention includes:
 a first substrate with at least one light output layer;
 a second substrate with a light transmitting function, positioned opposite to the first substrate; and
 a liquid crystal sandwiched between the first and second substrates, one of the first and second substrates having scan electrodes for applying multiple scan signals, one of the first and second substrates having signal electrodes for applying multiple signal voltages,
 wherein:
 the light output layer is arranged in stripes and extends in the same direction as the scan electrodes for applying scan signals;
 the first substrate has thereon a layer with a light polarizing function; and
 the first substrate, the light output layer, the layer with a light polarizing function, the liquid crystal, and the second substrate are arranged in this order.

Generally, a display is produced in accordance with a scan signal, and the scan timings vary from one scan electrode to another for applying scan signals. In contrast, according to the arrangement above in accordance with the present invention, the light output layer is arranged in stripes and extends in the same direction as the scan electrodes for applying scan signals. Therefore, the optical control device in accordance with the present invention can scan the light output layer for every scan timing, that is, the device can vary the light emitting timing for each light output layer corresponding to a scan electrode for applying scan signals, thereby achieving an impulse-type display. Further, the integration of the light output layer allows for a reduced thickness.

Further, through emission of different wavelengths, for example, R, G, and B light, for each light output layer arranged in stripes, a color display can be produced with no color filters. Hence, light transmission efficiency does not decrease due to use of color filters, and power consumption is reduced. In addition, the provision of a layer with a light polarizing function on the first substrate restrains problems that possibly occur due to a heating process when, for example, active elements are formed on the second substrate.

As mentioned above, an optical control device in accordance with the present invention allows for reductions in thickness, weight, and power consumption. Further, the impulse-type display allows for less blurred edges and persistent images when producing animation, thereby improving image quality.

Another optical control device in accordance with the present invention includes:

a first substrate with multiple light output layers;

a second substrate with a light transmitting function, positioned opposite to the first substrate; and a liquid crystal sandwiched between the first and second substrates, one of the first and second substrates having multiple active elements, one of the first and second substrates having gate electrodes for applying multiple scan signals, one of the first and second substrates having source electrodes for applying multiple signal voltage, wherein:

each light output layer is arranged in stripes and extends in the same direction as the gate electrodes;

each light output layer shines simultaneously with adjacent light output layers, but with a different wavelength from those of the adjacent light output layers; and the light output layers shine when a specified time has elapsed after a set of scan signals are transmitted to the gate electrodes and extinguish before a succeeding set of scan signals are transmitted.

According to the arrangement above, each light output layer is arranged in stripes and extends in the same direction as the gate electrodes for applying scan signals. Therefore, the optical control device in accordance with the present invention can scan the light output layers for every scan timing. That is, the device can set a light emitting timing for each light output layer corresponding to a gate electrode for applying scan signals so that the light output layers shine when a specified time has elapsed after a set of scan signals are transmitted to the gate electrodes and extinguish before a succeeding set of scan signals are transmitted, thereby achieving an impulse-type display using an active drive optical control device. Further, the integration of the light output layers allows for a reduced overall thickness.

Further, through emission of different wavelengths, for example, R, G, and B light, for each light output without blurred edges and persistent images with the properties of the impulse-type display well maintained, while keeping high display luminance.

The foregoing method of driving an optical control device may be adapted so that: the light output layers shines when a specified time has elapsed after a set of scan signals are transmitted to scan electrodes and extinguishes before a succeeding set of scan signals are transmitted to scan electrodes and extinguishes before a succeeding set of scan signals are transmitted, the light output layers shine with a different wavelength from those of adjacent light output layers; and more than one adjacent light output layers that shine with mutually different wavelengths are caused to shine simultaneously.

According to the method, the light output layers can be scanned correspondingly to applied scan signals for each scan electrode, that is, the light output layer can shine in accordance with scan timings, thereby producing an impulse-type display and allows for reductions in the number of ICs required for use in control.

Another method of driving an optical control device in accordance with the present invention is preferably such that more than one light output layers that shine with mutually different wavelengths are caused to shine simultaneously. This allows for reductions in the number of ICs required for use in control.

Another method of driving an optical control device in accordance with the present invention is preferably such that: the light output layer shines with a different wavelength from those of adjacent light output layers; and each light output layer is either red, green, or blue so that red, blue, and green repeat periodically. This enables a color display to be produced with no color filters, improving the efficiency in the use of light to achieve reduced power consumption.

For a fuller understanding of the nature of the invention, reference should be made to the ensuing detailed description taken in conjunction with the accompanying drawing.

BRIEF DESCRIPTION OF THE DRAWINGS

FIG. 6 is a cross-sectional view showing the structure of an optical control device of example 2 in accordance with the present invention.

BEST MODES FOR CARRYING OUT THE INVENTION

In reference to drawings, the following will describe best modes of implementing the present invention for further illustration of the present invention in more detail. The description is by no means intended to restrict the scope of the present invention.

Figure 1:
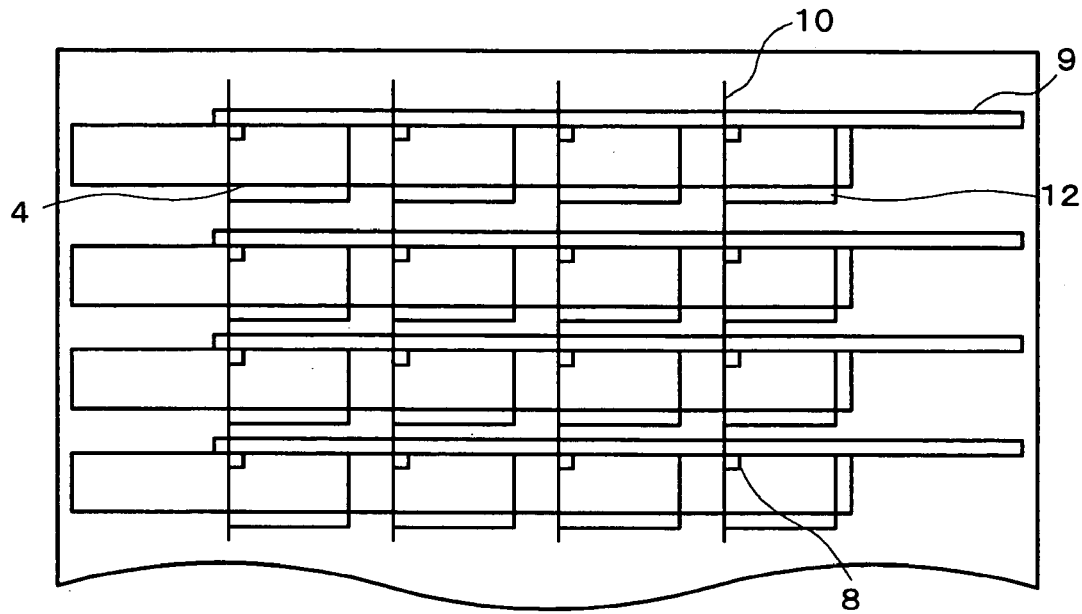
FIG. 1(a) is a plan view showing the structure of a first optical control device in accordance with the present invention.
FIG. 1(b) is a cross-sectional view of the first optical control device.
Figure 1:
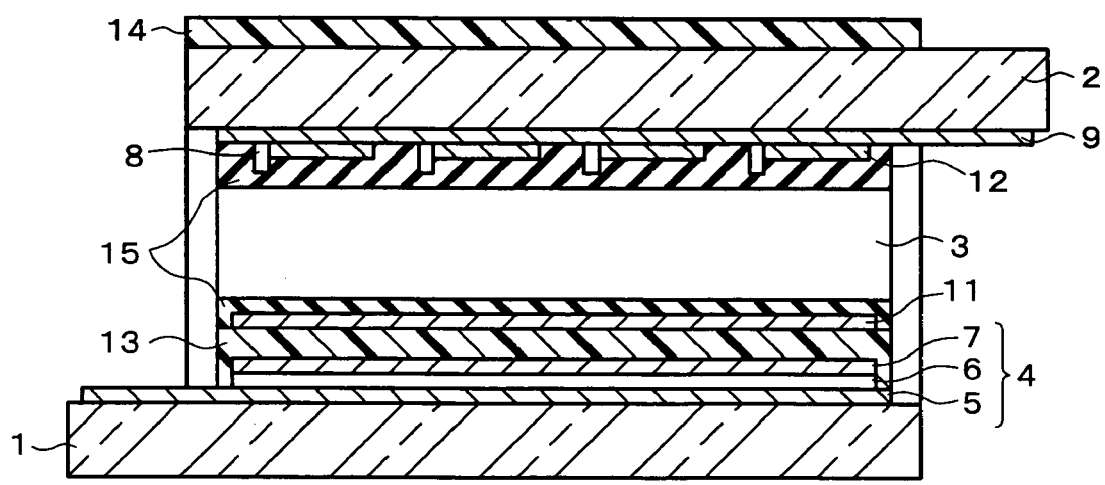

FIG. 1 (a) and FIG. 1 (b) are a plan and a cross-sectional view, respectively, of an optical control device of embodiment 1 in accordance with the present invention.

Referring to the cross-sectional view of FIG. 1(b), liquid crystal 3 is sandwiched between oppositely positioned glass substrates 1, 2. On the substrate 1 are there provided multiple light output layers 4 in stripes. The substrate 1 may alternatively be made of silicon, plastic, or another material. The substrate 2 disposed opposite the substrate 1 may alternatively be made of plastic or another transparent material.

The light output layer 4 is a light-emitting element (light emitter), such as an organic EL (Electro Luminescence) element, an inorganic EL (Electro Luminescence) element, or an FED (Field Emission Diode). On the substrate 1 are stacked metal electrodes 5, light emitting layers 6 made of, for example, organic EL elements, and transparent electrodes 7 made of, for example, ITO electrodes. The metal electrode 5, light emitting layer 6, and transparent electrode 7 can all be formed by photolithography or another patterning technique. On the transparent electrodes 7 are there further provided a polarizer layer 13 and an alignment film 15. The plan view of FIG. 1(a) shows the structure after the patterning.

If the light emitting layers 6 are formed completely covering the substrate 1, a polarizer layer may be formed on the light emitting layers 6 with the liquid crystal layer 3 provided directly on the polarizer layer.

FIG. 2(a) and FIG. 2(b) are a plan and a cross-sectional view, respectively, of an optical control device of embodiment 2 in accordance with the present invention. The optical control device may be adapted as in embodiment 2 in which optical waveguides 16 serving as light output layers are connected to an external light source 17. The optical waveguide 16 can be made from PMMA (Polymethyl Methacrylate) and other substances. The external light source 17 may be a light-emitting element, such as a semiconductor laser diode, an inorganic EL element, an organic EL element, or an fluorescent lamp.

In embodiments 1, 2, if the light output layer (the light output layers 4 or the optical waveguides 16) or the light source 17 emits monochromatic light, a monochromatic display results. In contrast, if multiple light output layers (light output layers 4 or optical waveguides 16) or light sources 17 emit different wavelengths of light, a color display is achieved. Preferably, the light output layers (light output layers 4 or optical waveguides 16) or light sources 17 are arranged in stripes, and each light output layer (light output layers 4 or optical waveguides 16) or light source 17 emits RGB light respectively. By adopting this structure, a color display is achieved without using a color filter which is essential in a conventional liquid crystal display, thereby improving the efficiency in the use of light and reducing power consumption. In addition, the structure, since involving no backlight, make it possible to fabricate thin, lightweight displays.

The liquid crystal material for the liquid crystal 3 sandwiched between the substrates 1, 2 is, for example, nematic, ferroelectric, antiferroelectric, or of a polymer composite type.

With a high display capacity and a high duty ratio, matrix-type organic EL elements present problems that their luminance and contrast are difficult to increase. In contrast, in the present invention, the organic EL element is basically driven using static driving, and good characteristics can be readily obtained. Further, the intensity of transmitted light is controllable by means of the liquid crystal part, and an overall good display performance can be achieved.

Electric field application means is necessary to drive the liquid crystal 3; to this end, electrodes are formed on either one of the substrates 1, 2 or both. Specifically, a set of electrodes are provided to either one of the substrates 1, 2 to apply multiple scan signals, and another set of electrodes are formed on either one of the substrate 1, 2 to apply multiple signal electrodes.

The optical control device of embodiment 1 shown in FIG. 1 is an example of the liquid crystal 3 being addressed by means of TFTs. The substrate 2 has TFTs 8 each of which is connected to a scan electrode (gate electrode) 9 and a signal electrode (source electrode) 10. Each pixel has a pixel electrode 12 fabricated from an ITO film, and the substrate 1 has an oppose electrode 11 fabricated from an ITO film.

It is preferable if active elements, such as the TFTs 8, are fabricated on the substrate 2 rather than on the substrate 1. There are two major reasons: (i) The TFTs 8 are fabricated at high temperatures, and the glass substrate 2 is less vulnerable to the heat in the fabrication process than the substrate 1 with the polarizer layer 13, etc. formed thereon. (ii) A 100% yield is difficult to achieve in the production of the TFTs 8 and the light output layers 4 from organic EL elements (light emitting layers 6) or alternatively the optical waveguides 16. If these two are provided on a single substrate, the overall yield, which is a product of individual yields, suffers; conversely, if the two are provided on separate substrates 1, 2, high yields will result through selection of only substrates of a good quality.

As an optical control device in accordance with the present invention, FIG. 1 (a) and FIG. 1 (b) show a liquid crystal element driven by means of TFTs, which is an active drive technique. Needless to say, the liquid crystal element can be driven otherwise, without using the TFTs 8: examples include a simple matrix-type display, an MIM (Metal Insulator Metal) display, and the use of a silicon substrate, to name a few.

As typical means to alter light intensity in liquid crystal, in FIGS. 1(a), 1(b), the optical control device of embodiment 1 in accordance with the present invention is provided with the polarizer layer 13 and the polarizer plate 14 as layers with a light polarizing function; in FIGS. 2(a), 2(b), the optical control device of embodiment 2 in accordance with the present invention is provided with the polarizer plate 14 and a polarizer plate as the polarizer layer 13. However, these polarizers can be omitted depending on the kind of the sandwiched liquid crystal. For example, polymer-dispersed types and guest-host types of liquid crystal can dispense with the layers with a light polarizing function (including the polarizer plate(s)).

As the polarizer layer 13, an ordinary polarizer plate may be used; alternatively, polarizer film is formed by coating. In the latter case, the polarizer 13 is formed in the following manner: (i) Form an alignment film. (ii) Rub and then coat the alignment film with a reactive liquid crystal polymer blended with a dichromatic pigment. This results in unidirectional alignment of the reactive liquid crystal polymer and the blended dichromatic pigment. (iii) Polymerize the polymer by radiation to retain the unidirectional alignment. The alignment film 15 is formed on the polarizer film thus formed, to complete the construction shown in FIG. 1(a), FIG. 1(b). In this structure, the light emitted by the light output layers 4 is, upon the entry into the liquid crystal 3, altered in the pixels through the control of electric field in the liquid crystal part, before finally leaving the substrate 2.

Now, the following will describe embodiment 3 in accordance with the present invention, in which we examined timings of light output from the light output layers 4 using the display of embodiment 1 (shown in FIG. 1(a), FIG. 1(b)). The light output layers 4 may continuously shine, in which case the display is of a hold type. An impulse-type display can be produced by allowing the light output layers 4 to shine only for a duration in a frame.

Figure 3:
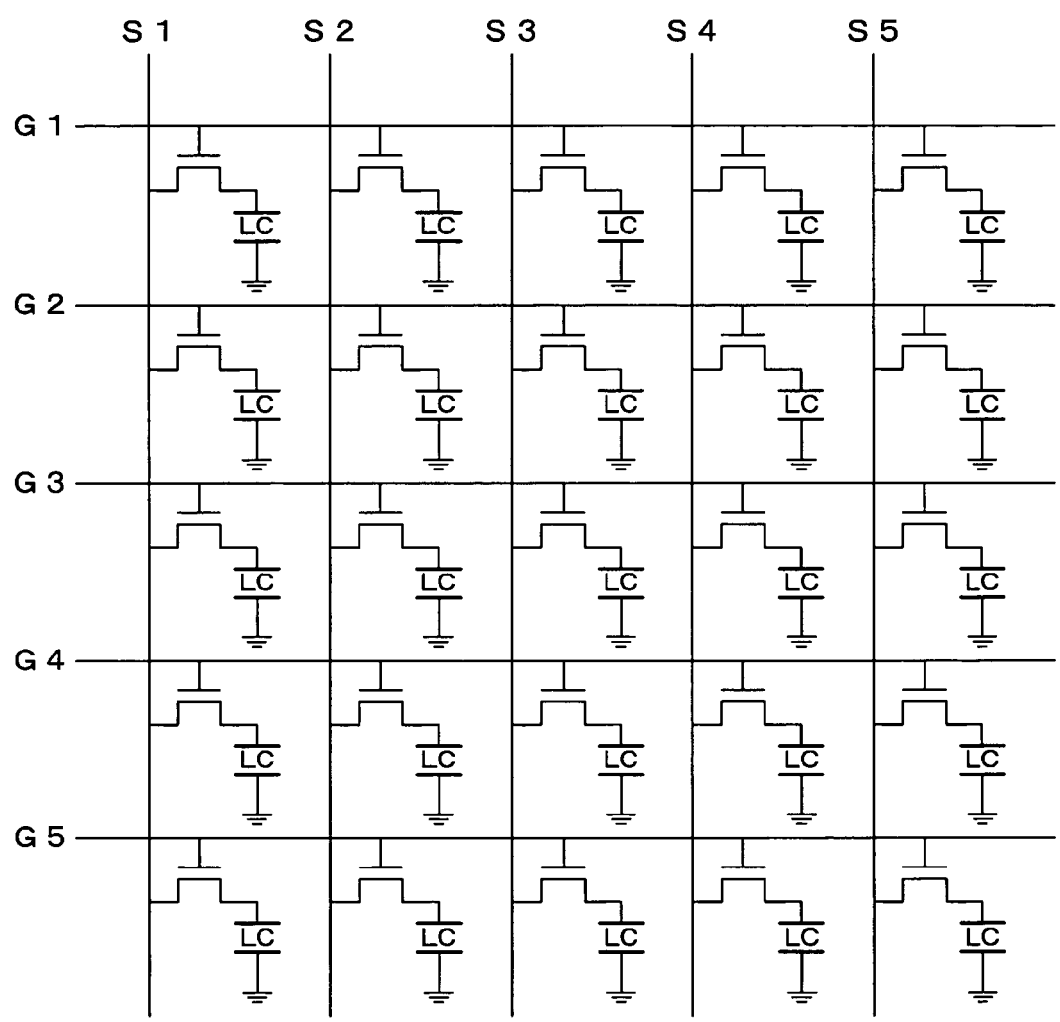
FIG. 3 is a diagram showing a configuration of TFT drive devices in a display.
Figure 4:
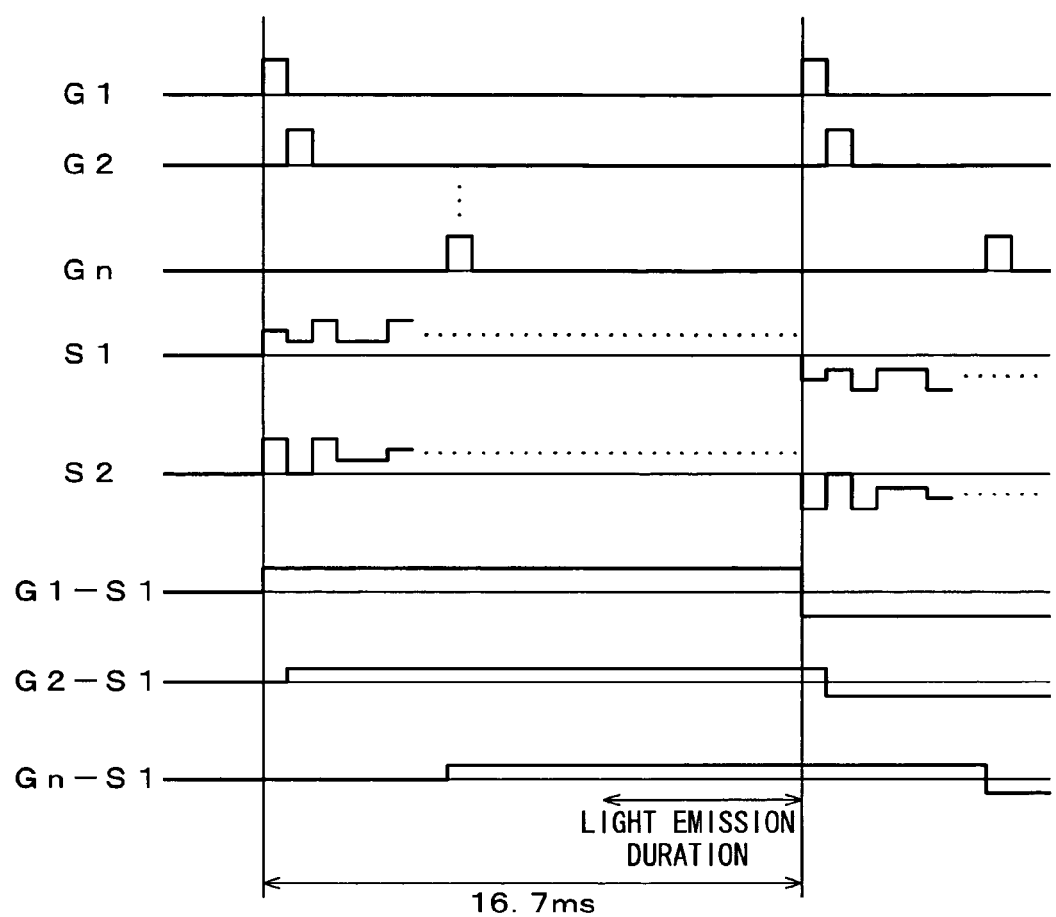
FIG. 4 is an explanatory drawing depicting the impulse-type display of embodiment 3 in accordance with the present invention.

This impulse-type display will be illustrated in reference to FIG. 3 and FIG. 4. A TFT driving display is taken as an example. FIG. 3 shows the structure of TFT drive devices in the display. FIG. 4 shows the waveforms of signals to produce an impulse-type display in embodiment 3.

A matrix display is achieved by synchronously transmitting signals through the gate electrodes (scan electrodes) 9 (identified as G1, G2, G3, . . . in FIG. 3 and FIG. 4) to turn on the gates and data signals through the source electrodes (signal electrodes) 10 (identified as S1, S2, S3, . . . in FIG. 3 and FIG. 4) in accordance with a desired display state of the pixels. The amount of transmitted light is controlled by application of voltage to the pixels. Note that the description here (in the case of FIG. 4) is made on an assumption that the TFT drive devices have altogether n gate electrodes. The light output layers 4 are not allowed to shine while the electrodes 9, 10 are transmitting signals to send a display content to the liquid crystal part. The light output layers 4 are allowed to shine only after the liquid crystal part is in a state matched to the display content, that is, only after the liquid crystal 3 has sufficiently responded to the signals. An impulse-type display is thus achieved.

The light output layers 4 are now examined in more detail regarding the durations of light emission. The light output layers 4 shine preferably for 5% to 70% of each display frame time and more preferably for 15% to 40% of each display frame time. If the light output layers 4 shine for a duration exceeding 70% of a frame time, the display gradually loses its characteristics as an impulse-type display and increasingly acquires those of an hold-type display, exhibiting blurred edges and persistent images. Accordingly, preferable durations are 40% or less.

Further, if a duration as much as 70% is to be set aside for light emission, the response speed of the liquid crystal 3 and the writing speed for the TFTs 8 are heavily constrained, since a display frame, 16.7 ms, less the response time of the liquid crystal 3 and the write time for the TFTs 8 (equal to the ON time of a gate per scan line (gate electrode 9) multiplied by the number of scan lines) is available for light emission (the light output layers 4 are not allowed to shine before a condition occurs where the liquid crystal 3 matches to a whole set of display information). If the duration of light emission is 5% or less of the frame, it becomes difficult to increase display luminance: for example, the light output layer 4 shining only for 5% of the frame must shine with an intensity 20 times that of the light output layer 4 shining throughout the frame, to achieve identical luminance. Accordingly, preferable durations are 15% or more.

For example, the metal electrodes 5 and the transparent electrodes 7 in FIG. 1, not necessarily having to be formed in a pattern, cost less if not formed in a pattern. Even if the electrodes 5, 7 are formed in a pattern, they do not need to be driven separately. The whole display area can shine simultaneously by applying voltage to all the electrodes in accordance with the shining pattern of FIG. 4.

Now, the following will describe embodiment 4 in accordance with the present invention, in which we examined different timings of light output from the light output layers 4 using the foregoing display: the timings in embodiment 4 differ from those in embodiment 3. Defining the timings of light output provides a method to vary the duration in which the light output layers 4 shine.

Figure 5:
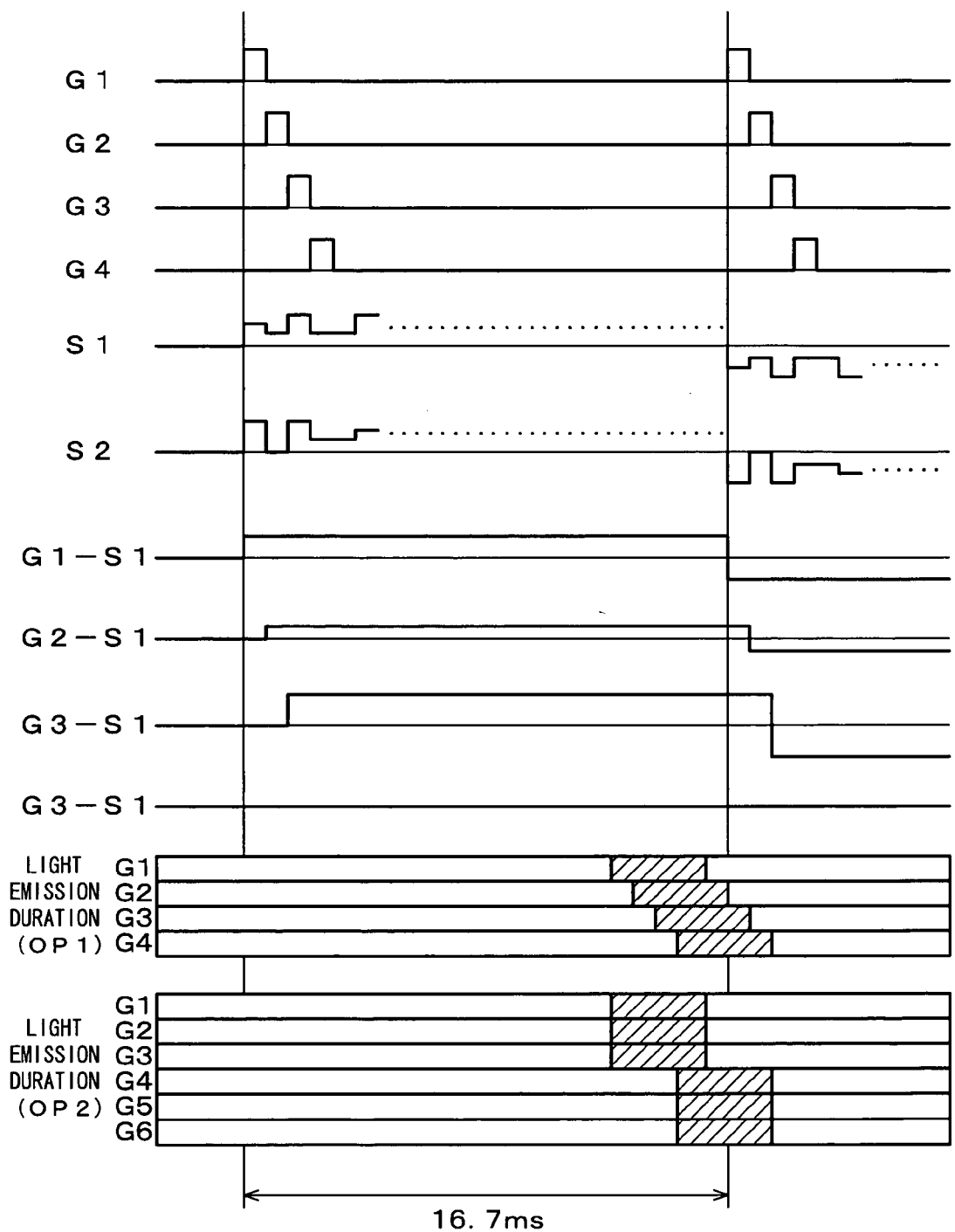
FIG. 5 is an explanatory drawing depicting the impulse-type display of embodiment 4 in accordance with the present invention.

A TFT drive display will now be described in reference to FIG. 3 and FIG. 5. The waveforms of signals in FIG. 5 show timings of light output in the impulse-type display of embodiment 4.

A matrix display is achieved by synchronously transmitting signals through the gate electrodes (scan electrodes) 9 (identified as G1, G2, G3, . . . in FIG. 3 and FIG. 5) to turn on the gates and data signals through the source electrodes (signal electrodes) 10 (identified as S1, S2, S3, . . . in FIG. 3 and FIG. 5) in accordance with a desired display state of the pixels. The amount of transmitted light is controlled by application of voltage to the pixels. The light emitting layers 6 emit light when a specified time has elapsed after the gates are turned off. Thus, an impulse-type display can be produced with different light emission timings for different lines as shown in FIG. 5.

To produce the impulse-type display described in embodiment 4, the light output layers 4 need to be arranged in stripes extending in the same direction as the electrodes (gate electrodes 9) applying scan signals. Since the display content for the liquid crystal display part is displayed in accordance with the scan signals, and different scan lines (gate electrodes 9) are scanned at different timings, the corresponding timings for the light emitting layers 6 must be varied. As scanning of the light emitting layers 6, three or more of them may shine at a time. In any case, all the lines must shine for an equal duration and are extinguished before a succeeding gate is turned on. Major advantages of this scheme include: (i) The liquid crystal 3 exhibits a greater response speed than in embodiment 3. (ii) A longer duration is available for light emission, and display luminance improves.

In the case of the method of embodiment 3, no light is emitted before a condition occurs where the liquid crystal 3 matches to a whole set of display information; therefore, 16.7 ms less the response time of the liquid crystal 3 and the write time for the TFTs 8 (the ON time of a gate per scan line (gate electrode) multiplied by the number of scan lines) is available for light emission.

In contrast, in the case of the method of embodiment 4 whereby the timing for the light output layers 4 is varied for every scan line, in principle, 16.7 ms less the response time of the liquid crystal 3 and the ON time of a gate per scan line is available for light emission; there are less constraints on the response time of the liquid crystal 3 than in embodiment 3. Supposing that the liquid crystal 3 responds at the same speed in the two cases, a longer duration of light emission can be set aside in embodiment 4, which results in better display luminance.

The light output layers 4 shine preferably for 5% to 70% of each display frame and more preferably for 15% to 40% of each display frame as mentioned earlier.

The timing is varied for each light output layer 4 associated with a scan line, the light output layers 4 must be controlled separately. To this end, taking the structure shown in FIGS. 1(a), 1(b) as an example, the metal electrodes 5 correspond to the gate electrodes 9 and therefore must be formed in a pattern in accordance with the light output layers 4. The transparent electrodes 7, which are the other electrodes forming the light output layers 4, may not be formed in a pattern.

In the case of the light output layers 4 formed by repeated RGB patterns, it is also a good method to cause three RGB to shine at a time, because three RGB forms one display unit and preferably shine together for the same duration. To cause the three to shine and extinguish together, it would be sufficient to control the three together.

The method is also applicable when more than three light output layers 4 are controlled together. The more light output layers 4 are controlled together, the more advantages result: for example, the pattern is less elaborate and easier to fabricate, and less ICs are required to control the light output layers 4.

Figure 8:
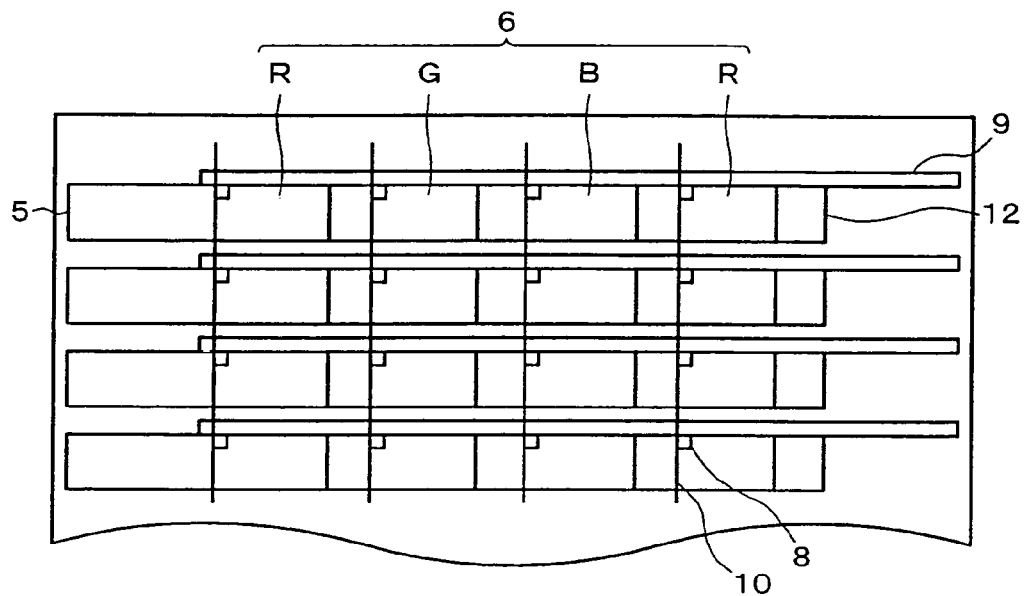
FIG. 8(a) is a plan view showing the structure of an optical control device in which a light output layer is formed by a repeated RGB pattern.
FIG. 8(b) is a cross-sectional view of the optical control device.
Figure 8:
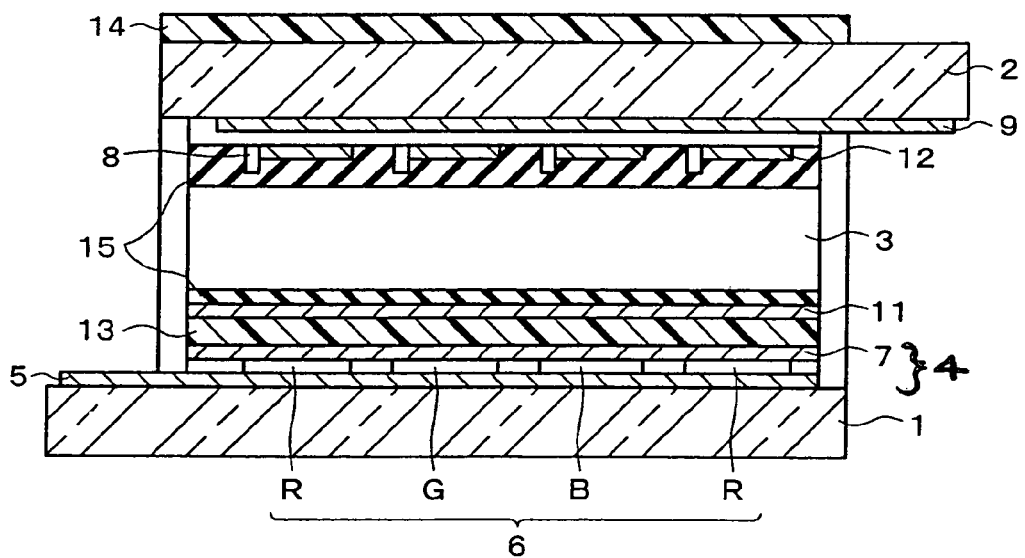
Figure 9:
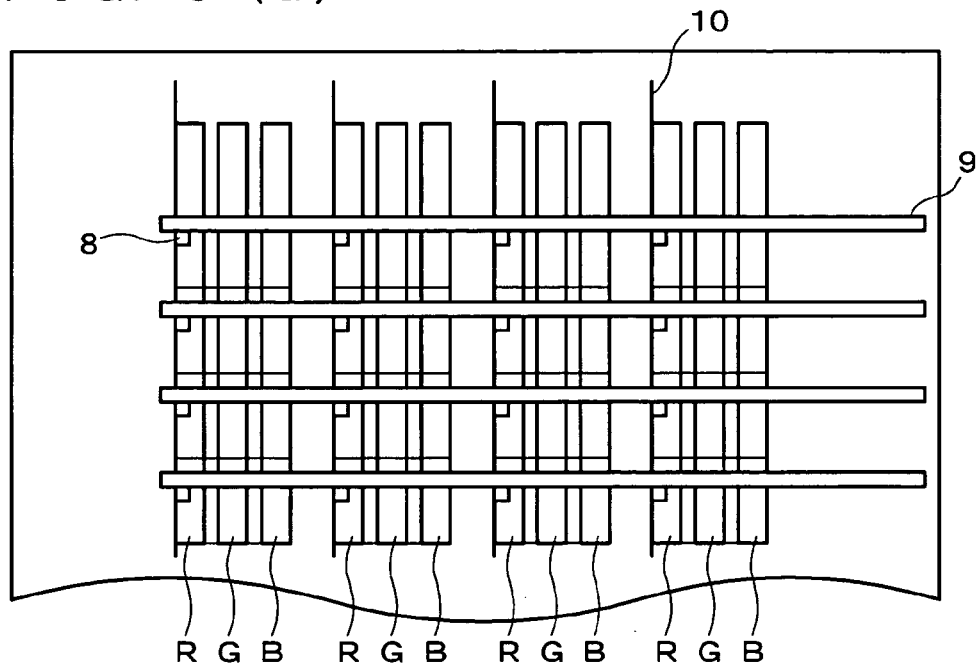
FIG. 9(a) is a plan view showing the structure of an optical control device that differs from the optical control device of FIG. 8(a) in which a light output layer is formed by a repeated RGB pattern.
FIG. 9(b) is a cross-sectional view of the optical control device.
Figure 9:
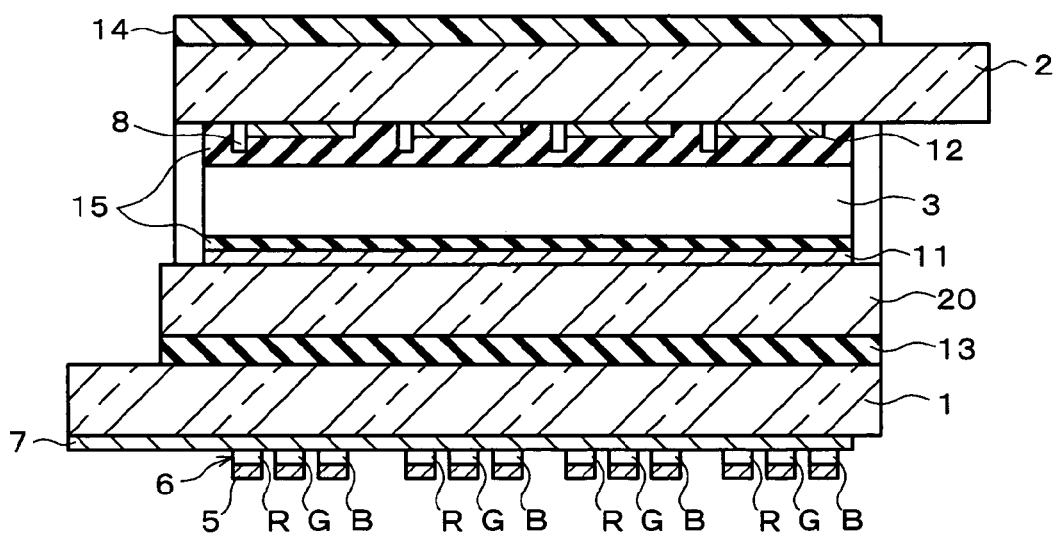
Figure 10:
FIG. 10(a) through FIG. 10(h) are processing views illustrating a first method of fabricating the optical control device of FIG. 6.
Figure 10:
Figure 10:
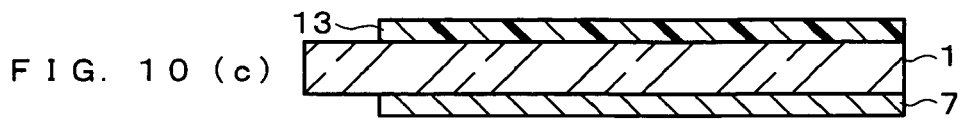
Figure 10:
Figure 10:
Figure 10:
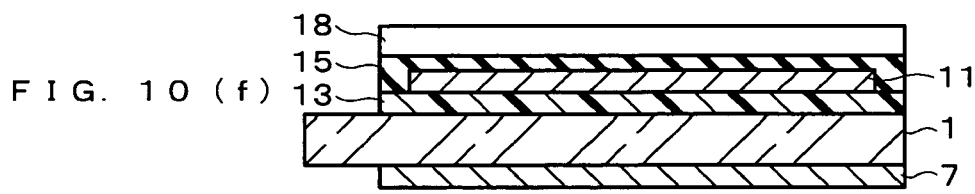
Figure 10:
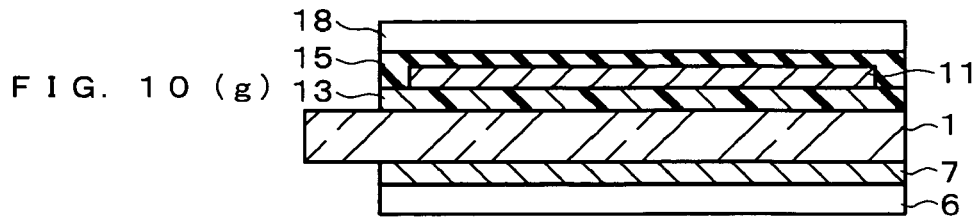
Figure 10:
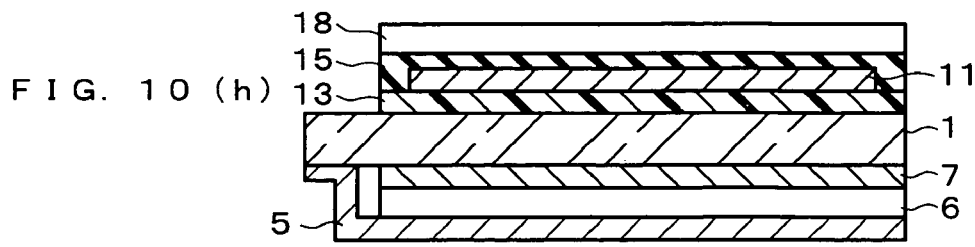
Figure 11:
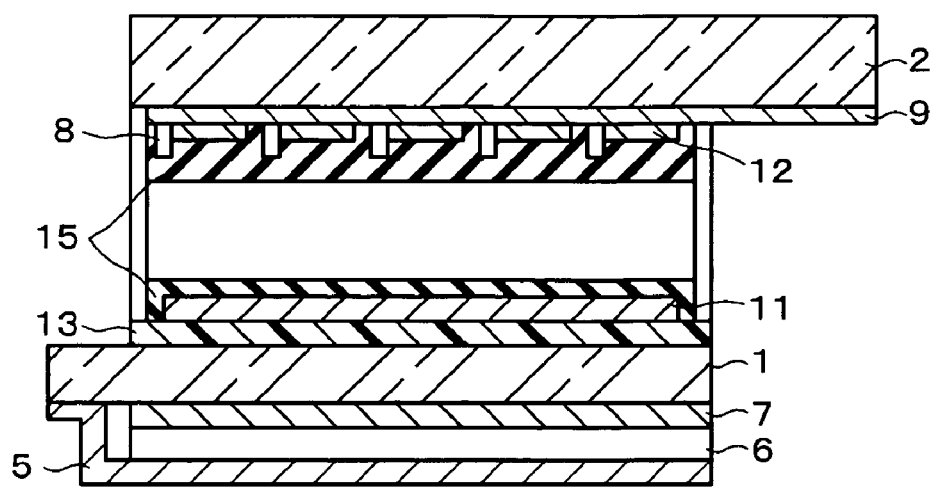
FIG. 11(a) and FIG. 11(b) are processing views illustrating steps that follow the combining of substrates in the first method of fabricating the optical control device of FIG. 6.
Figure 11:
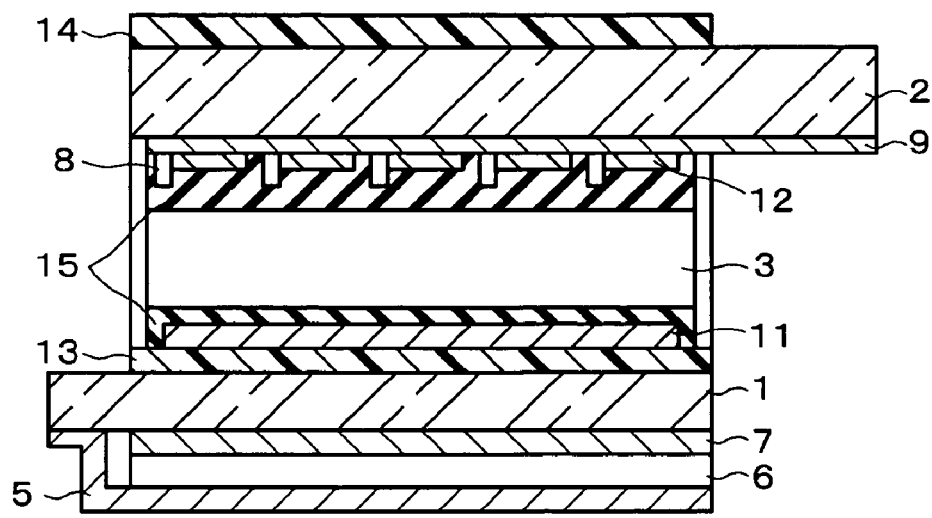
Figure 12:
FIG. 12(a) through FIG. 12(e) are processing views illustrating a second method of fabricating the optical control device of FIG. 6.
Figure 12:
Figure 12:
Figure 12:
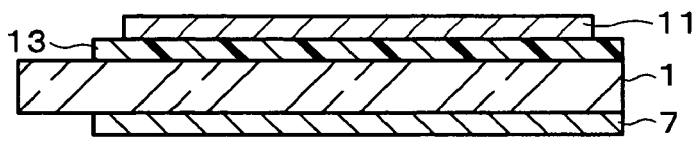
Figure 12:
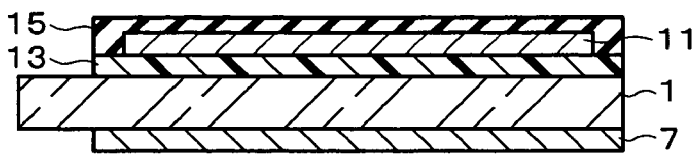

It is also possible to arrange RGB as shown in FIG. 8(a) and FIG. 8(b). The arrangement enables a light output layer 4 corresponding to a certain gate electrode 9 to emit RGB light simultaneously. Signals are supplied to respective RGB pixels through the source electrodes 10. FIG. 9(a) and FIG. 9(b) show an alternative arrangement. FIG. 8(a) and FIG. 9(a) are plan views showing, respectively, the structures of optical control devices. FIG. 8(b) and FIG. 9(b) are cross-sectional views showing, respectively, those structures. Numeral 20 in FIG. 9(b) is a glass substrate.

As mentioned above, the drive method for the optical control device in accordance with the present invention is capable of adjusting the luminance of a light source (light output layer) for each scan electrode (each gate electrode 9 in the embodiments), thereby achieving a low power consumption. For example, to fabricate a display with a maximum luminance of 500 cd/m$^2$, a typical liquid crystal display with a backlight must keep the backlight shining with a luminance of 500 cd/m$^2$. Even when a dark display is produced for most of the time, the backlight still must deliver a luminance of 500 cd/m$^2$.

In contrast, the method in accordance with the present invention stipulates that the light output layers extend in the same direction as the scan electrodes; therefore, the light source part can be adjusted for each scan electrode (scan line) in terms of luminance by causing the light output layers to shine for a maximum luminance required for the associated lines. This holds true too when multiple light output layers are caused to shine together. In either case, the same results are achieved by causing the light output layers to shine for a maximum luminance required for the associated lines. Accordingly, when a dark display is to be produced, the light source part is allowed to shine only for a decreased luminance, thereby achieving a lower power consumption.

With the light source part producing a decreased luminance, fine tone display can be achieved. Assume that a display is fabricated which produces a global maximum luminance of 500 cd/m$^2$, a local minimum luminance of 5 cd/m$^2$, and a local maximum luminance of 10 cd/m$^2$. Since a typical display has a 500 cd/m$^2$ backlight, the luminance must be varied in the range of 5 cd/m$^2$ to 10 cd/m$^2$ only through the transmittance of the liquid crystal. However, this translates that the transmittance of the liquid crystal must be varied 2.5% to 5%. Considering temperature distribution, irregular cell thickness, and other factors that affect the characteristics, it is never easy to produce a fine tone display.

In contrast, the scheme in accordance with the present invention stipulates that each local light source part is specified to effect a luminance of 10 cd/m$^2$ and thus can depend on a 50% to 100% variation of the transmittance of the liquid crystal to produce a display. Hence, the method is less likely to be affected by those factors that could affect the characteristics of the display, being capable of producing a fine display.

As to visibility, subtle variations in thickness of almost black colors contributors greatly to produce a beautiful display image. With consideration of this factor, the present scheme has great advantages. The present scheme is suitable also to produce fine tones of almost black colors based on 10- or 12-bit tone data instead of 8-bit tone data.

An advantage of the present scheme, especially in comparison to an ordinary organic EL display, is that the present scheme can use a-Si-TFTs.

A display based on an ordinary organic EL technology is said to require the use of p-Si-TFTs to increase the display capacity (the number of scan lines). It is also said that these TFTs differ from the counterparts used with liquid crystal and that multiple (normally two to four) TFTs must be used for each pixel. This means that the display is difficult and costly to fabricate.

In contrast, a display incorporating an optical control device based on the present scheme is compatible with those TFTs that drive liquid crystal, such as a-Si-TFTs, and therefore boasts better productivity and lower costs.

So far in the present embodiment, optical control devices based on the present scheme have been descried as displays with light source parts. The scheme is also applicable to a display that operates in both transmission and reflection modes. It would be needless to mention that the application will require a suitable optical design and configuration of optical members. Meeting these requirements properly, the resultant display can operate in transmission mode with the light source part activated when in dark environments and in reflection mode in bright environments.

In the present embodiment, a TFT driven liquid crystal is taken as an example of the liquid crystal element section for illustrative purposes. Needless to say, alternative liquid crystals are available: for example, ferroelectric liquid crystal, antiferroelectric liquid crystal, and PDLC.

Now, concrete examples of the foregoing embodiments will be described.

EXAMPLE 1

Example 1 in accordance with the present invention is a concrete example of the optical control device of foregoing embodiment 1. The following will describe example 1 in accordance with the present invention in reference to FIGS. 1(a), 1(b).

Metal electrodes 5 are deposited and fabricated in stripes on a glass substrate 1. Organic EL layers are formed thereon as light emitting layers 6. Each organic EL layer shines either in R, G, or B color. Transparent electrodes 7 are formed thereon from an ITO film that is subjected to no patterning.

A polarizer layer 13 is formed on the transparent electrodes 7 in the following manner: (i) Form an alignment film (omitted from FIG. 1(a), 1(b)), (ii) Rub and then coat the alignment film with a reactive liquid crystal polymer blended with a dichromatic pigment. This results in unidirectional alignment of the reactive liquid crystal polymer and the blended dichromatic pigment. (iii) Polymerize the polymer by radiation to retain the unidirectional alignment to complete the formation of the polarizer layer 13 which is a polarizer film. The polarizer layer 13 is then entirely coated with an ITO film as an opposite electrode 11. An alignment film 15 is further applied and then rubbed.

TFTs 8 and connecting wires are formed on a substrate 2. Each TFT 8 is connected to a scan electrode (gate electrode) 9 and a signal electrode (source electrode) 10. Each pixel has a pixel electrode 12 fabricated from an ITO film.

Subsequently, the substrates 1 and 2 fabricated as in the foregoing are combined, with nematic liquid crystal for use with a TN-type display injected and sealed between the substrates 1 and 2. Here, it is important to arrange either the scan electrodes (gate electrodes) 9 or the signal electrodes (source electrodes) 10 so that they extend in the same direction as the light output layers 4 formed in stripes. In example 1, the scan electrodes (gate electrodes) 9 are arranged to extend in the same direction as the light output layers 4 formed in stripes.

EXAMPLE 2

Referring to FIG. 6, example 2 in accordance with the present invention will be now described. FIG. 6 is a cross-sectional view showing the structure of an optical control device of the present example.

The optical control device of the present example includes an oppositely positioned glass substrate 1 and substrate 2 and a liquid crystal 3 interposed between the substrates 1, 2. The substrate 1 is provided thereon with light output layers 4. The substrate 2 is provided with TFTs 8.

Describing in more detail, transparent electrodes 7 made of ITO film are provided on the glass substrate 1 opposite to the liquid crystal 3. On the transparent electrodes 7 are there provided organic EL layers in stripes that act as light emitting layers 6. On the light emitting layers 6 are there provided metal electrodes 5 that are subjected to no patterning. On the other side of the substrate 1, a polarizer layer 13 is provided (since a polarizer plate is used, the polarizer layer 13 will be hereinafter referred to as the polarizer plate 13 in the present example). The polarizer plate 13 is then covered entirely with an opposite electrode 11 made of an ITO film. Further, on the opposite electrode 11 is there provided an alignment film 15 to align the liquid crystal 3.

The TFTs 8 and wires interconnecting the TFTs 8 are provided on the glass substrate 2 opposite to the liquid crystal 3. Each TFT 8 is connected to a scan electrode (gate electrode) 9 and a signal electrode (source electrode) (omitted from FIG. 6). Each pixel has a pixel electrode 12 fabricated from an ITO film and covered with an alignment film 15. A polarizer plate 14 is provided on the other side of the substrate 2.

The liquid crystal material for the liquid crystal 3 here is a nematic liquid crystal for use with an TN-type display. It is important to arrange either the scan electrodes (gate electrodes) 9 or the signal electrodes (source electrodes) (omitted from FIG. 6) so that they extend in the same direction as the light output layers 4 formed in stripes; therefore, in the present example.

Two major methods are available to fabricate the cell (optical control device) in FIG. 6: (1) Form the organic EL layers before attaching the TFT substrate. (2) Combining the TFT substrate before forming the organic EL layers.

The following will described these methods in more detail. Note that the TFT substrate refers to the substrate 2 with the TFTs 8, gate electrodes 9, source electrodes 10, pixel electrodes 12, alignment film 15, etc. formed thereon.

First, in reference to FIGS. 10(a) through 10(h), 11(a), and 11(b), method (1) will be described whereby the organic EL layers are formed before the TFT substrate is attached.

Step 1: An ITO film as a drive electrode (transparent electrode 7) for an organic EL element (light output layers 4) is deposited on a surface of the glass substrate 1 (see FIG. 10(a)) and formed in a pattern by photolithography (see FIG. 10(b)). Note that the substrate 1 should be as thin as possible to produce a good, parallax-free display.

Step 2: The polarizer plate 13 is formed on the other surface of the substrate 1 (see FIG. 10(c)), and the opposite electrode 11 used to drive the liquid crystal is fabricated from an ITO film on the polarizer plate 13 (see FIG. 10(d)). In this step, alternatively, the opposite electrode 11 used to drive the liquid crystal may be fabricated before the formation of the polarizer plate 13.

Step 3: The alignment film 15 is formed on the opposite electrode 11 to align the liquid crystal 3 and then rubbed (see FIG. 10(e)). Considering the previously formed polarizer plate 13, the alignment film 15 is preferably made of a material that forms film by baking at low temperatures. Then, if necessary, a laminous film 18 is attached to provide protection to the alignment film 15 (see FIG. 10(f)).

Step 4: Organic EL layers are formed in stripes as the light emitting layers 6 on the transparent electrodes 7 (see FIG. 10(g)). Thereafter, Metal electrodes 5 are formed which will serve as cathodes of the electrodes to drive the organic EL element (light output layers 4) (FIG. 10(h)). Further, preferably, the side closer to the light emitting layers 6 is covered with a sealing substrate (not shown) to provide a countermeasure to deterioration of the organic EL layers. Each light emitting layer 6 is formed so as to shine either in R, G, or B color.

Step 5: The TFT substrate is attached (see FIG. 11(a)). If the laminous film 18 providing protection to the alignment film is attached, the laminous film 18 is taken off before the TFT substrate is attached. Although in the foregoing description of step 3, the rubbing preceded the attaching of the laminous film 18, the rubbing may be carried out after the laminous film 18 is taken off.

Step 6: Thereafter, the polarizer plate 14 is formed on the substrate 2. After completing the combining of the substrates, a nematic liquid crystal for use with a TN-type display is injected as the liquid crystal 3 (see FIG. 11(b)). Preferably, the liquid crystal material is injected while evacuating on the opposite side to the injection port for the liquid crystal, because if the side of the light emitting layers 6 is covered with a sealing substrate, vacuum injection would cause the sealing substrate to break due to the internal pressure. A so-called drop injection is another useful means, whereby the TFT substrate is attached after the liquid crystal material is dropped.

Next, in reference to FIG. 12(a) through FIGS. 12(e) and 13(a) through FIG. 13(c), method (2) will be described whereby the TFT substrate is attached after the organic EL layers are formed.

Step 1: An ITO film as a drive electrode (transparent electrode 7) for an organic EL element (light output layers 4) is deposited on a surface of the glass substrate 1 (see FIG. 12(a)) and formed in a pattern by photolithography (see FIG. 12(b)). Note that the substrate 1 should be as thin as possible to produce a good, parallax-free display.

Step 2: The polarizer plate 13 is formed on the other surface of the substrate 1 (see FIG. 12(c)), and the opposite electrode 11 used to drive the liquid crystal is fabricated from an ITO film on the polarizer plate 13 (see FIG. 12(d)). In this step, alternatively, the opposite electrode 11 used to drive the liquid crystal may be fabricated before the formation of the polarizer plate 13.

Step 3: The alignment film 15 is formed on the opposite electrode 11 to align the liquid crystal 3 and then rubbed (see FIG. 12(e)). Considering the previously formed polarizer plate 13, the alignment film 15 is preferably made of a material that forms film by baking at low temperatures.

Figure 13A:
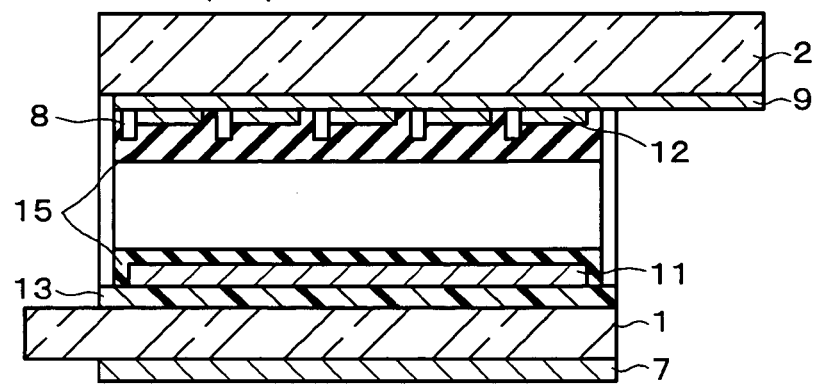
FIG. 13(a) through FIG. 13(c) are processing views illustrating steps that follow the combining of substrates in the second method of fabricating the optical control device of FIG. 6.
Figure 13B:
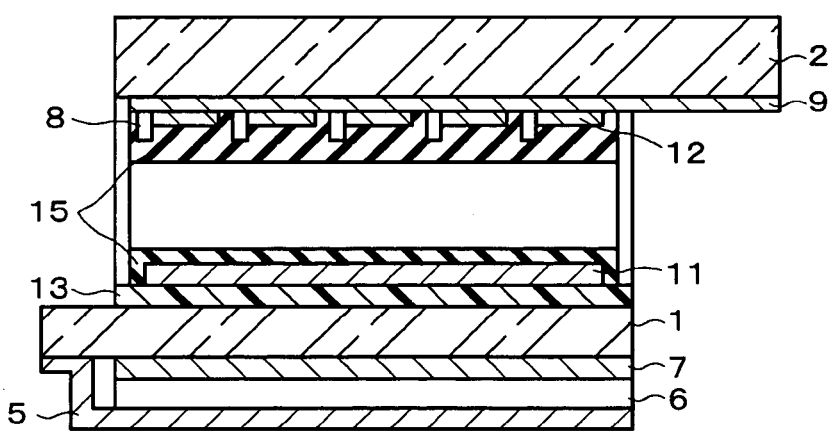

Step 4: the TFT substrate is attached (see FIG. 13(a)).

Step 5: Organic EL layers as the light emitting layers 6 are formed on the transparent electrodes 7 (see FIG. 13(b)). After the formation, if the transparent electrodes 7 are to be washed, the injection port for the liquid crystal is plugged so that washing liquid does not seep into a gap on the alignment film. Thereafter, if organic EL layers are to be vapor deposited, the whole assembly must be placed in a chamber which is then evacuated. This creates an environment in which the substrate may break due to internal pressure with the seepage path plugged; to prevent this from happening, the substance blocking the injection port must be removed. After the formation of the organic EL layers, metal electrodes 5 are formed which will serve as cathodes of the electrodes to drive the organic EL element (light output layers 4) (FIG. 13(b)). Further, preferably, the side closer to the light emitting layers 6 is covered with a sealing substrate (not shown) to provide a countermeasure to deterioration of the organic EL layers.

Figure 13C:
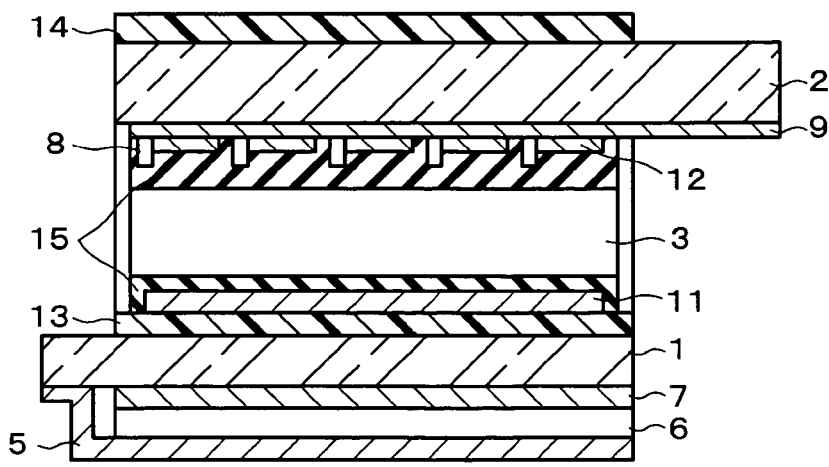
Figure 14:
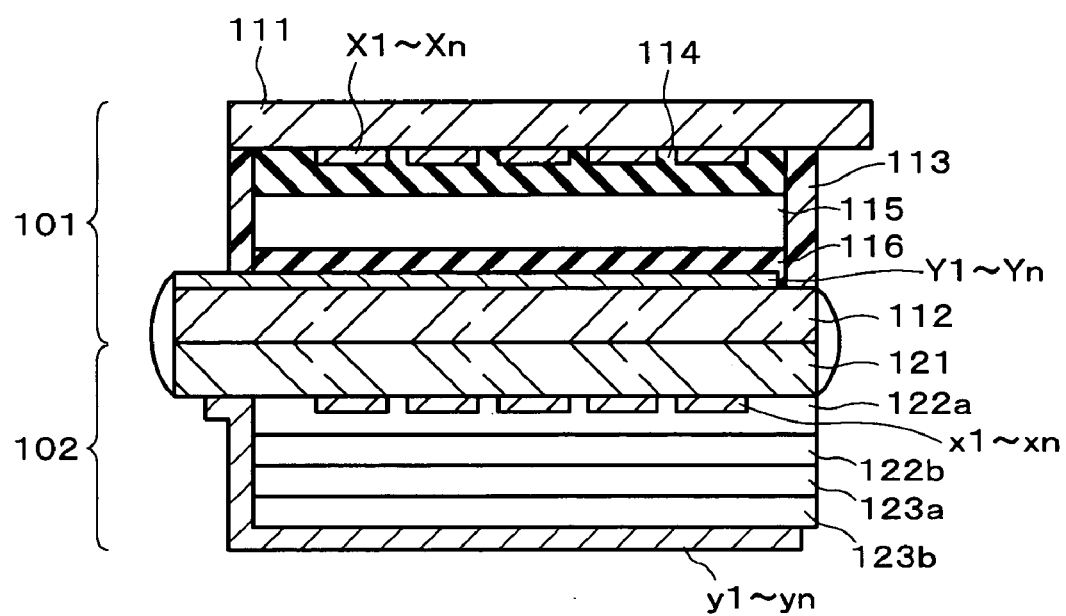
FIG. 14 is a cross-sectional view showing composite stacking of a liquid crystal display element section and an organic EL display element section in a conventional composite element-type display.

Step 6 (last step): after forming the polarizer plate 14 on the substrate 2, a nematic liquid crystal for use with a TN-type display is injected as the liquid crystal 3 (see FIG. 13(c)). Preferably, the liquid crystal material is injected while evacuating on the opposite side to the injection port for the liquid crystal, because if the side of the light emitting layers 6 is covered with a sealing substrate, vacuum injection would cause the sealing substrate to break due to the internal pressure.

EXAMPLE 3

Figure 7:
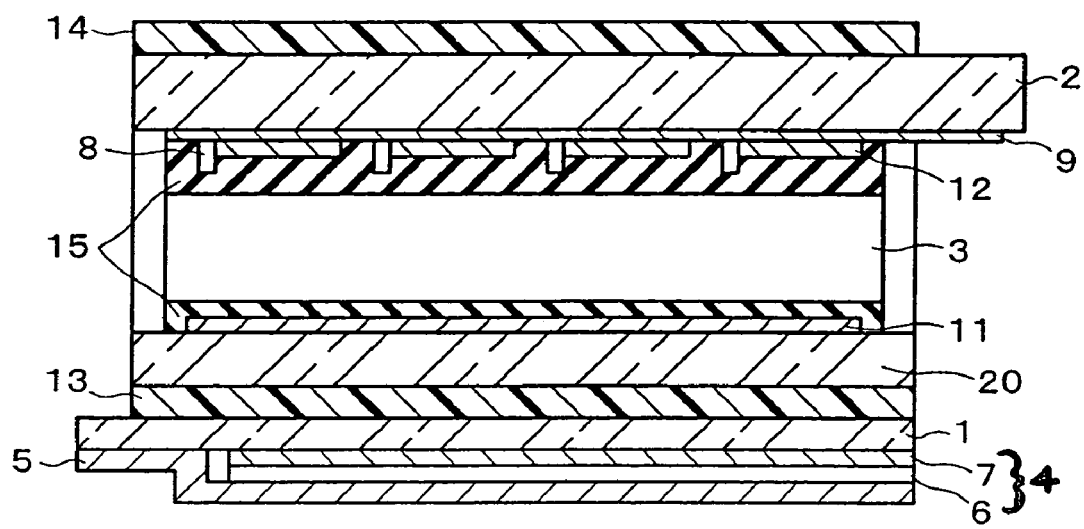
FIG. 7 is a cross-sectional view showing the structure of an optical control device of example 3 in accordance with the present invention.

Referring to FIG. 7, example 3 in accordance with the present invention will be now described. FIG. 6 is a cross-sectional view showing the structure of an optical control device of the present example.

The optical control device of the present example has an identical structure to that of the optical control device of example 2 above, except that a glass substrate 20 is additionally provided between the opposite electrode 11 and the polarizer layer 13 (since a polarizer plate is used, the polarizer layer 13 will be hereinafter referred to as the polarizer plate 13 in the present example).

The optical control device of the present example is fabricated in the following manner.

The transparent electrodes 7 are formed in stripes from an ITO film on the glass substrate 1 through patterning. Then, organic EL layers are formed as the light emitting layers 6. Each light emitting layer 6 is formed so as to shine either in R. G, or B color. On the light emitting layers 6 are there provided metal electrodes 5 that are subjected to no patterning. The opposite electrode 11 is formed from an ITO film, covering the whole surface of the glass substrate 20. Thereafter, the alignment film 15 to align the liquid crystal 3 is applied to the opposite electrode 11 and rubbed.

The TFTs 8 and wires interconnecting the TFTs 8 are provided on the substrate 2. Each TFT 8 is connected to a scan electrode (gate electrode) 9 and a signal electrode (source electrode) (omitted from FIG. 7). Each pixel has a pixel electrode 12 fabricated from an ITO film.

Subsequently, the substrate 2 fabricated as in the foregoing is combined with the glass substrate 20, with nematic liquid crystal for use with a TN-type display injected and sealed between the substrates 2 and 20. The polarizer plate 13 is formed on the glass substrate 20 opposite to the liquid crystal 3. The substrate 1 is attached to the polarizer plate 13. Here, it is important to arrange either the scan electrodes (gate electrodes) 9 or the signal electrodes (source electrodes) (omitted from FIG. 7) so that they extend in the same direction as the light output layers 4 formed in stripes. In present example 3, the scan electrodes (gate electrodes) 9 are arranged to extend in the same direction as the light output layers 4 formed in stripes.

EXAMPLE 4

As example 4 in accordance with the present invention, the following will describe the optical control device in FIGS. 1(a), 1(b) driven by an impulse-type display method depicted in FIG. 4.

According to the drive method of the present example, a matrix display is achieved by synchronously transmitting signals through the gate electrodes (scan electrodes G1, G2, G3, . . . ) sequentially to turn on the gates and data signals through the source electrode (signal electrodes S1, S2, S3, . . . ) in accordance with a desired display state of the pixels. An example of voltage applied to the pixels (G1-S1, G2-S1, . . . ) is shown. The amount of transmitted light is controlled by application of voltage to the pixels. Note that in the figure, the display method in FIG. 4 is described on an assumption that the TFTs 8 have altogether n gate electrodes. The light output layers 4 are not allowed to shine while the electrodes are transmitting signals to send a display content to the liquid crystal part. The light output layers 4 are allowed to shine only after the liquid crystal part is in a state matched to the display content, that is, only after the liquid crystal has sufficiently responded to the signals. An impulse-type display is thus achieved.

EXAMPLE 5

As example 5 in accordance with the present invention, the following will describe the optical control device in FIGS. 1(a), 1(b) driven by an impulse-type display method depicted in FIG. 5, whereby the light output layers 4 shine for variable durations.

A matrix display is achieved by synchronously transmitting signals through the gate electrodes (scan electrodes G1, G2, G3, . . . ) to turn on the gates and data signals through the source electrode (signal electrodes S1, S2, S3, . . . ) in accordance with a desired display state of the pixels. An example of voltage applied to the pixels (G1—S1, G2-S1, . . . ) is shown. The amount of transmitted light is controlled by application of voltage to the pixels. The light emitting layers 6 shine when a specified time has elapsed after the gates are turned off (identified as OP1 in FIG. 5). In other words, the gate signal is turned off for each gate line, and only after the liquid crystal 3 sufficiently responds to this voltage, the light emitting layer 6 corresponding to the gate line is allowed to shine. The driving allows for an impulse-type display shown in FIG. 5.

Here, the electrodes (gate electrodes) 9 for applying scan signals are arranged to extend in the same direction as the light output layers 4 formed in stripes. The display content is displayed on the liquid crystal display part in accordance with the scan signal, and the scan timing is varied for each scan line that forms RGB. The timing for the light emitting layers 6 varies accordingly.

EXAMPLE 6

As example 6 in accordance with the present invention, the following will describe a drive method modified from that in example 5, whereby the light emission timings and light emission timings of the light output layers 4 are varied. According to the present drive method, as identified as OP2 in FIG. 5, the light output layers 4 are formed by repeated RGB patterns, with a set of three, RGB light output layers 4 shine together. In a set of RGB, all the lines shine for an equal duration and extinguished before a next gate is turned on. Further, since three (RGB) of them form a single display unit, if they are made to shine and extinguish with an equal light emission duration, they can be controlled by sending signals together.

The structure allows for a reduced number of IC drivers for controlling the light emitting layers 4 and effects a line sequential drive-type impulse display.

Three or more of them may be controlled together. The more of them are controlled together, the more advantages result: for example, the pattern of the electrodes and light emitting layers is less meticulous and easier to fabricate, and less ICs are required to control.

EXAMPLE 7

Figure 2:
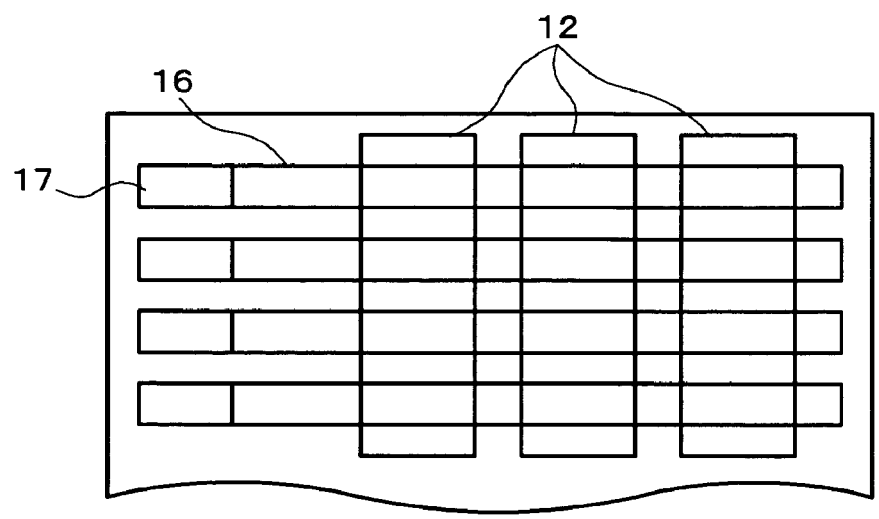
FIG. 2(a) is a plan view showing the structure of a second optical control device in accordance with the present invention.
FIG. 2(b) is a cross-sectional view of the second optical control device.
Figure 2:
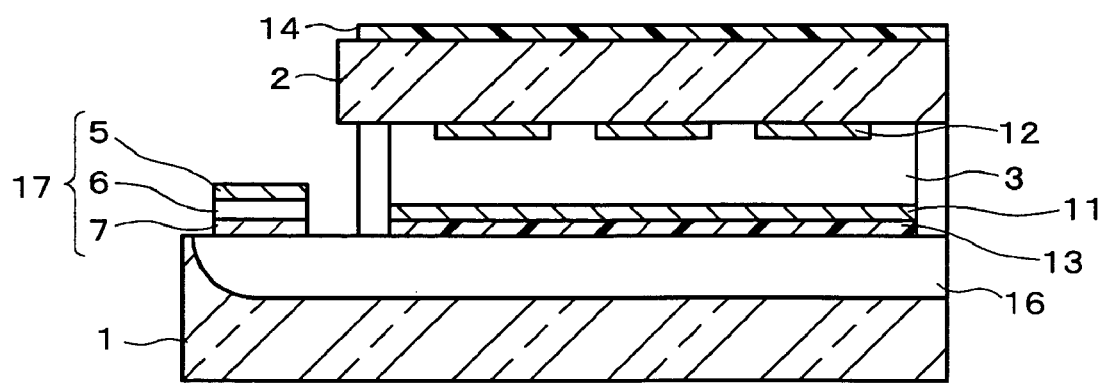

As example 7, in reference to FIGS. 2(*a*), 2(*b*), the following will describe light output layers 4 having a different structure from that depicted in FIGS. 1(*a*), 1(*b*).

The optical waveguides 16 are provided as light output layers on the glass substrate 1. The light source 17 optically coupled to the optical waveguides 16 are situated outside an area where a display section is provided. In the present example, organic EL is used as an example of the light emitting layer 6 in the light sources 17.

Next, the alignment film (omitted from FIGS. 2(*a*), 2(*b*)) are formed, rubbed, and coated with a reactive liquid crystal polymer blended with a dichromatic pigment. This results in unidirectional alignment of the reactive liquid crystal polymer and the blended dichromatic pigment. The polymer is polymerized by radiation to retain the unidirectional alignment in the polymer. The polarizer layer 13 (since a polarizer plate is used, the polarizer layer 13 will be hereinafter referred to as the polarizer plate 13 in the present example) is thus formed. The opposite electrode 111 made of an ITO film is provided on the polarizer plate 13 and formed into a predetermined pattern. Further, the alignment film 15 is applied and rubbed.

The pixel electrode 12 is formed by patterning an ITO film on the substrate 2. Then, the substrate 2 is combined with the previously formed substrate 1, with an antiferroelectric liquid crystal injected as the liquid crystal 3. Here, it is important to arrange either the scan electrodes (gate electrodes) or the signal electrodes (source electrodes) (both electrodes omitted from FIG. 2) so that they extend in the same direction as the optical waveguides 16 formed in stripes to serve as light output layers. In the present example, the scan electrodes (gate electrodes) are arranged to extend in the same direction as the optical waveguides 16 formed in stripes.

As described so far, an optical control device in accordance with the present invention includes:
  a first substrate with at least one light output layer;
  a second substrate with a light transmitting function, positioned opposite to the first substrate; and
  a liquid crystal sandwiched between the first and second substrates, one of the first and second substrates having scan electrodes for applying multiple scan signals, one of the first and second substrates having signal electrodes for applying multiple signal voltages,
  wherein:
  the light output layer is arranged in stripes and extends in the same direction as the scan electrodes for applying scan signals;
  the first substrate has thereon a layer with a light polarizing function; and
  the first substrate, the light output layer, the layer with a light polarizing function, the liquid crystal, and the second substrate are arranged in this order.

Generally, a display is produced in accordance with a scan signal, and the scan timings vary from one scan electrode to another for applying scan signals. In contrast, according to the arrangement above in accordance with the present invention, the light output layer is arranged in stripes and extends in the same direction as the scan electrodes for applying scan signals. Therefore, the optical control device in accordance with the present invention can scan the light output layer for every scan timing, that is, the device can vary the light emitting timing for each light output layer corresponding to a scan electrode for applying scan signals, thereby achieving an impulse-type display.

In addition, the integration of the light output layer allows for a reduced overall thickness.

Further, through emission of different wavelengths, for example, R, G, and B light, for each light output layer arranged in stripes, a color display can be produced with no color filters. Hence, light transmission efficiency does not decrease due to use of color filters, and power consumption is reduced.

As mentioned above, an optical control device in accordance with the present invention allows for reductions in thickness, weight, and power consumption. Further, the impulse-type display allows for less blurred edges and persistent images when producing animation, thereby improving image quality.

Another optical control device in accordance with the present invention includes:
  a first substrate with multiple light output layers;
  a second substrate with a light transmitting function, positioned opposite to the first substrate; and
  a liquid crystal sandwiched between the first and second substrates, one of the first and second substrates having multiple active elements, one of the first and second substrates having gate electrodes for applying multiple scan signals, one of the first and second substrates having source electrodes for applying multiple signal voltages, wherein:

the light output layer is arranged in stripes and extends in the same direction as the gate electrodes;

each light output layer shines simultaneously with adjacent light output layers, but with a different wavelength from those of the adjacent light output layers; and the light output layers shine when a specified time has elapsed after a set of scan signals are transmitted to the gate electrodes and extinguished before a succeeding set of scan signals are transmitted.

With the arrangement, the light output layer is arranged in stripes and extends in the same direction as the gate electrodes for applying scan signals. Therefore, the optical control device can scan the light output layer for every scan timing, that is, the device can vary the light emitting timing for each light output layer corresponding to a gate electrode for applying scan signals, thereby achieving an impulse-type display.

In addition, the integration of the light output layer allows for a reduced overall thickness.

Further, through emission of different wavelengths, for example, R, G, and B light, for each light output layer arranged in stripes, a color display can be produced with no color filters. Hence, light transmission efficiency does not decrease due to use of color filters, and power consumption is reduced.

As mentioned above, an optical control device in accordance with the present invention allows for reductions in thickness, weight, and power consumption. Further, the impulse-type display allows for less blurred edges and persistent images when producing animation, thereby improving image quality.

An optical control device in accordance with the present invention is preferably such that the active elements are provided on the second substrate.

To fabricate active elements, such as TFTs, they are fabricated at high temperatures. Thus providing active elements on the second substrate, not on the first substrate having a light output layer, is less likely to cause problems during the heating process. Further, a 100% yield is difficult to achieve in the production of the light output layer and the active elements. If these two are provided on a single substrate, the yield suffers; conversely, if the two are provided separately on the first and second substrates as in the above arrangement, higher yields will result.

Another control device in accordance with the present invention is preferably such that the first substrate has a layer with a light polarizing function. With the active elements, for example, fabricated on the second substrate, the arrangement makes it less likely for problems to occur during a heating process.

Another optical control device in accordance with the present invention is preferably such that:

the light output layer provided on the first substrate is formed by a light emitting layer composed of at least one of an organic EL light emitter, an inorganic EL light emitter, and an FED light emitter;

a first electrode film, the light emitting layer, and a second electrode film are provided in this order on the first substrate; and the light emitting layer shines with application of a voltage across the first and second electrode films.

The arrangement allows for fabrication of the light emitting layer with a reduced thickness, and hence of the optical control device with a reduced overall thickness.

Another optical control device in accordance with the present invention is preferably such that the light output layer provided on the first substrate is formed by a combination of an optical waveguide and a light source coupled to the optical waveguide and positioned in a non-display section area.

According to the arrangement, light emitting parts (light sources) can be formed in a part of the substrate with the emitted light directed to an output part formed in stripes through an optical waveguide, thereby achieving further reductions in weight.

A method of driving the foregoing optical control device in accordance with the present invention is preferably such that the light output layer shines for a duration of 5% to 70% of each display frame time.

Placing such limits on the duration of light emission by the light output layer enables high quality animation to be produced without blurred edges and persistent images with the properties of the impulse-type display well maintained, while keeping high display luminance.

Further, preferably, the light output layer emits light for a duration of 15% to 40% of each display frame time.

Placing further limits on the duration of light emission by the light output layer surely enables high quality animation to be produced without blurred edges and persistent images with the properties of the impulse-type display well maintained, while keeping high display luminance.

The foregoing method of driving an optical control device may be adapted so that: the light output layer shines when a specified time has elapsed after a set of scan signals are transmitted to scan electrodes and extinguishes before a succeeding set of scan signals are transmitted; the light output layer shines with a different wavelength from those of adjacent light output layers; and more than one adjacent light output layers that shine with mutually different wavelengths are caused to shine simultaneously.

According to the method, the light output layer can be scanned correspondingly to applied scan signals for each scan electrode, that is, the light output layer can shine in accordance with scan timings, thereby producing an impulse-type display and allows for reductions in the number of ICs required for use in control.

Another method of driving an optical control device in accordance with the present invention is preferably such that: the light output layer shines with a different wavelength from those of adjacent light output layers; and each light output layer is either red, green, or blue so that red, blue, and green repeat periodically.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

INDUSTRIAL APPLICABILITY

As mentioned above, according to the optical control device and a driving method thereof in accordance with the present invention, an impulse-type display can be produced using a display apparatus with organic EL and liquid crystal.

A product can be offered which restrains blurred edges and persistent images when producing animation and exhibits improved image quality.

In addition, the integration of the light output layers allows for reductions in thickness, weight, and power consumption, when compared to an arrangement in which a light source, such as a backlight, is separately provided. Further, by causing the light output layers formed in stripes to shine with mutually different wavelengths, no color filters are required, and a display can be realized with further lowered power consumption.

What is claimed is:

1. An optical control device that does not use a color filter, the device comprising:
   a first substrate having a plurality of light output layers;
   a second substrate with a light transmitting function, positioned opposite to the first substrate;
   a liquid crystal sandwiched between the first and second substrates,
   first electrodes, on one of the first and second substrates, for applying multiple scan signals to the liquid crystal for an image display;
   second electrodes, on the other of the first and second substrates, for applying multiple signal voltages to the liquid crystal for an image display; and
   a layer with a light polarizing function on the first substrate,
   wherein:
   each of the plurality of light output layers corresponds to only one of the first electrodes and is arranged in stripes and extends in the same direction as the first electrodes; and the first substrate, the plurality of light output layers, the layer with a light polarizing function, the liquid crystal, and the second substrate are arranged in this order, and
   wherein all of the plurality of light output layers shine when a specified time has elapsed such that the liquid crystal between each of the first and second substrates is able to respond to the scan signals and signal voltages to modulate light intensity transmitted therethrough to a desired display intensity after a complete set of data signals for each scan line is transmitted to the first electrodes and extinguishes before a succeeding complete set of data signals for each scan line is transmitted.

2. An optical control device that does not use a color filter, the device comprising:
   a first substrate having a plurality of light output layers;
   a second substrate with a light transmitting function, positioned opposite to the first substrate;
   multiple active elements on one of the first and second substrates;
   gate electrodes, on the one of the first and second substrates, for applying multiple scan signals to a liquid crystal sandwiched between the first and second substrates for an image display; and
   source electrodes, on the other of the first and second substrates, for applying multiple signal voltages to the liquid crystal for an image display,
   wherein:
   each of the plurality of light output layers corresponds to only one of the gate electrodes and is arranged in stripes and extends in the same direction as the gate electrodes;
   each of the plurality of light output layers shines simultaneously with adjacent light output layers, but with a different wavelength from those of the adjacent light output layers; and
   all of the plurality of light output layers shine when a specified time has elapsed such that the liquid crystal between each of the first and second substrates is able to respond to the scan signals and signal voltages to modulate light intensity transmitted therethrough to a desired display intensity after a complete set of data signals for each scan line is transmitted to the gate electrodes and extinguish before a succeeding complete set of data signals for each scan line is transmitted.

3. The optical control device as defined in claim 2, wherein the active elements are provided on the second substrate.

4. The optical control device as defined in claim 2, further comprising:
   a layer with a light polarizing function on the first substrate.

5. The optical control device as defined in claim 1, wherein:
   each of the plurality of light output layers provided on the first substrate is formed by a light emitting layer composed of at least one of an organic EL light emitter, an inorganic EL light emitter, and an FED light emitter; and
   the light emitting layer shines with application of a voltage across the first electrodes and the second electrodes.

6. The optical control device as defined in claim 2, wherein:
   each of the light output layers provided on the first substrate is formed by a light emitting layer composed of at least one of an organic EL light emitter, an inorganic EL light emitter, and an FED light emitter;
   the gate electrodes, the light emitting layer, and the source electrodes are provided in this order on the first substrate; and
   the light emitting layer shines with application of a voltage across the gate electrodes and the source electrodes.

7. The optical control device as defined in claims 1, wherein
   each of the plurality of light output layers includes an optical waveguide and a light source coupled to the optical waveguide and positioned in a non-display section area.

8. The optical control device as defined in claim 2, wherein
   the each of the light output layers includes an optical waveguide and a light source coupled to the optical waveguide and positioned in a non-display section area.

9. The optical control device as defined in claim 1, wherein
   each of the light output layers shines with spectrum periodically varying according to a position of the light output layer.

10. The optical control device as defined in claim 9, wherein the each of the plurality of light output layer shines with spectrum periodically varying for each pixel.

11. An optical control device-driving method, comprising the steps of:
    using an optical device that does not use a color filter, the device including:
    a first substrate having a plurality of light output layers;
    a second substrate with a light transmitting function, positioned opposite to the first substrate;
    a liquid crystal sandwiched between the first and second substrates;

first electrodes, on one of the first and second substrates for applying multiple scan signals to the liquid crystal for an image display;

second electrodes, on the other of the first and second substrates, for applying multiple signal voltages to the liquid crystal for an image display; and a layer with a light polarizing function on the first substrate, wherein:

each of the plurality of light output layers corresponds to only one of the first electrodes and is arranged in stripes and extends in the same direction as the first electrodes; and the first substrate, the plurality of light output layers, the layer with a light polarizing function, the liquid crystal, and the second substrate are arranged in this order, setting such that each of the plurality of light output layer shines for a duration of 5 to 70% of each display frame time, shining all of the plurality of light output layers when a specified time has elapsed such that the liquid crystal between each of the first and second substrates is able to respond to the scan signals and signal voltages to modulate light intensity transmitted therethrough to a desired display intensity after a complete set of data signals for each scan line is transmitted to the first electrodes; and extinguishing all of said plurality light output layers before a succeeding complete set of data signals for each scan line is transmitted.

12. The optical control device-driving method as set forth in claim 11, wherein each of the light output layers shines for a duration of 15% to 40% of each display frame time.

13. An optical control device-driving method, the method comprising the steps of:

providing an optical device wherein the optical device includes:

a first substrate having a plurality of light output layers;

a second substrate with a light transmitting function, positioned opposite to the first substrate;

a liquid crystal sandwiched between the first and second substrates;

first electrodes, on one of the first and second substrates, for applying multiple scan signals to the liquid crystal for an image display;

second electrodes, on the other of the first and second substrates, for applying multiple signal voltages to the liquid crystal for an image display; and a layer with a light polarizing function on the first substrate, wherein:

each of the plurality of light output layers corresponds to only one of the first electrodes and is arranged in stripes and extends in the same direction as the first electrodes; and the first substrate, the plurality of light output layers, the layer with a light polarizing function, the liquid crystal, and the second substrate are arranged in this order;

shining all of the the light output layers when a specified time has elapsed such that the liquid crystal between each of the first and second substrates is able to respond to the scan signals and signal voltages to modulate light intensity transmitted therethrough to a desired display intensity after a complete set of data signals for each scan line is transmitted to scan lines; and extinguishing all of said light output layers before a succeeding complete set of data signals for each scan line is transmitted.

14. An optical control device-driving method, the method comprising the steps of:

providing an optical device, wherein the optical device includes:

a first substrate having a plurality of with at least on light output layers, a second substrate with a light transmitting function, positioned opposite to the first substrate;

a liquid crystal sandwiched between the first and second substrates;

electrodes, on one of the first and second substrates, for applying multiple scan signals to the liquid crystal for an image display;

electrodes, on the other of the first and second substrates, for applying multiple signal voltages to the liquid crystal for an image display; and a layer with a light polarizing function on the first substrate, wherein:

each of the plurality of light output layers corresponds to only one of the electrodes that apply scan signals to the liquid crystal and is arranged in stripes and extends in the same direction as the electrodes for applying the multiple scan signals; and the first substrate, the plurality of light output layers, the layer with a light polarizing function, the liquid crystal, and the second substrate are arranged in this order;

shining all of the plurality of light output layers when a specified time has elapsed such that the liquid crystal between each of the first and second substrates is able to respond to the scan signals and signal voltages to modulate light intensity transmitted therethrough to a desired display intensity after a complete set of data signals for each scan line is transmitted to scan lines; and extinguishing all of said plurality of light output layers before a succeeding complete set of data signals for each scan line is transmitted;

wherein each of the plurality of light output layers shines with a different wavelength from those of adjacent light output layers; and more than one of the plurality of light output layers that shine with mutually different wavelengths are caused to shine simultaneously.

15. The method as defined in claim 14, wherein each of the plurality of light output layers is either red, green, or blue so that red, blue, and green repeat periodically.

16. The optical control device defined in claim 2, wherein the first substrate, the plurality of light output layers, the liquid crystal, and the second substrate are arranged in this order.

17. The optical control device defined in claim 2, wherein each of the plurality of light output layer is adjusted in terms of luminance for each gate electrode.

18. The optical control device as defined in claim 2, wherein each of the plurality of light output layers is adjusted in terms of luminance in accordance with a maximum luminance which is based on the signal voltages applied to the source electrodes.

19. The optical control device defined in claim 2, wherein each of the plurality of light output layer shines with spectrum periodically varying according to a position of the light output layer.

20. The optical control device as defined in claim 19, wherein
each of the plurality of light output layers shines with spectrum periodically varying for each pixel.

21. The optical control device as defined in claim 1, wherein the layer with the light polarizing function is provided on the light output layer.

22. The optical control device as defined in claim 4, wherein the layer with the light polarizing function is provided on the light output layer.

23. The optical control device as defined in claim 11, wherein the layer with the light polarizing function is provided on the light output layer.

24. The optical control device as defined in claim 13, wherein the layer with the light polarizing function is provided on the light output layer.

25. The optical control device as defined in claim 14, wherein the layer with the light polarizing function is provided on the light output layer.

26. The optical control device as defined in claim 1, wherein
each of the plurality of light output layers is adjusted in terms of luminance to a maximum luminance of the data signals for each scan line.

27. The optical control device as defined in claim 2, wherein
each of the plurality of light output layers is adjusted in terms of luminance to a maximum luminance of the data signals for each scan line.

28. The method as defined in claim 11, comprising the step of adjusting each of the plurality of light output layers, corresponding to each scan line, in terms of luminance to a maximum luminance of the data signals for each scan line.

29. The method as defined in claim 13, comprising the step of adjusting each of the plurality of light output layers, corresponding to each scan line, in terms of luminance to a maximum luminance of the data signals for each scan line.

30. The method as defined in claim 14, comprising the step of adjusting each of the plurality of light output layers, corresponding to each scan line, in terms of luminance to a maximum luminance of the data signals for each scan line.

31. The optical control device as defined in claim 26, wherein a transmittance of the liquid crystal is controlled according to the maximum luminance of the light output layer corresponding to the data signals for each scan line.

32. The optical control device as defined in claim 27, wherein a transmittance of the liquid crystal is controlled according to the maximum luminance of the light output layer corresponding to the data signals for each scan line.

33. The method as defined in claim 28, wherein a transmittance of the liquid crystal is controlled according to the maximum luminance of the light output layer corresponding to the data signals for each scan line.

34. The method as defined in claim 29, wherein a transmittance of the liquid crystal is controlled according to the maximum luminance of the light output layer corresponding to the data signals for each scan line.

35. The method as defined in claim 30, wherein a transmittance of the liquid crystal is controlled according to the maximum luminance of the light output layer corresponding to and the data signals for each scan line.

36. The optical control device as defined in claim 31, wherein a transmittance of the liquid crystal includes 100%.

37. The optical control device as defined in claim 32, wherein a transmittance of the liquid crystal includes 100%.

38. The method as defined in claim 33, wherein a transmittance of the liquid crystal includes 100%.

39. The method as defined in claim 34, wherein a transmittance of the liquid crystal includes 100%.

40. The method as defined in claim 35, wherein a transmittance of the liquid crystal includes 100%.

* * * * *